United States Patent [19]

Perlman

[11] Patent Number: 4,998,006
[45] Date of Patent: Mar. 5, 1991

[54] ELECTRIC HEATING ELEMENTS FREE OF ELECTROMAGNETIC FIELDS

[75] Inventor: Daniel Perlman, Arlington, Mass.
[73] Assignee: Brandeis University, Waltham, Mass.
[21] Appl. No.: 483,672
[22] Filed: Feb. 23, 1990
[51] Int. Cl.$^5$ .............................................. H05B 3/36
[52] U.S. Cl. .................................. 219/212; 219/529; 219/549
[58] Field of Search ............... 219/212, 549, 528, 529, 219/552, 553; 338/61, 62, 63

[56] References Cited

U.S. PATENT DOCUMENTS

| | | | |
|---|---|---|---|
| 874,023 | 12/1907 | McElroy | 338/62 |
| 1,100,708 | 6/1914 | Brooks | 338/61 |
| 1,155,058 | 9/1915 | Hay | 338/61 |
| 1,972,499 | 9/1934 | Tarpley | 338/62 |
| 3,222,497 | 12/1965 | Gordon | 219/529 |
| 3,356,835 | 12/1967 | Watson | 219/549 |
| 3,458,846 | 7/1969 | Young | 338/61 |
| 3,492,463 | 1/1970 | Wringer et al. | 219/553 |
| 3,846,620 | 11/1974 | Hocker | 338/61 |
| 3,859,506 | 1/1975 | Weckstein | 219/552 |
| 4,159,459 | 6/1979 | Sease et al. | 338/61 |
| 4,200,973 | 5/1980 | Farkas | 29/611 |
| 4,319,216 | 3/1982 | Ikeda et al. | 338/61 |
| 4,365,109 | 12/1982 | O'Loughlin | 174/109 |
| 4,436,986 | 3/1984 | Carlson | 219/212 |
| 4,547,658 | 10/1985 | Crowley | 219/212 |
| 4,698,488 | 10/1987 | Kishimoto | 219/549 |
| 4,792,663 | 12/1988 | Kishimoto et al. | 219/549 |
| 4,910,391 | 3/1990 | Rowe | 219/549 |

FOREIGN PATENT DOCUMENTS

| | | | |
|---|---|---|---|
| 2611106 | 2/1988 | France . | |
| 930753 | 5/1982 | U.S.S.R. | 338/63 |
| 2168580 | 6/1986 | United Kingdom | 219/212 |

OTHER PUBLICATIONS

"Strategies to Reduce Population Exposure . . . ", Dept. of Eng. & Public Policy, Carnegie-Mellon Univ.

Primary Examiner—Teresa J. Walberg
Attorney, Agent, or Firm—Fish & Richardson

[57] ABSTRACT

An electric heating element which includes two sets of adjacent electrically conductive wires electrically insulated from each other. By adjacent is meant that the two sets of wires are placed as close to each other as is possible without electrically connecting the two wires; for example, the wires are preferably within 2 to 4 millimeters of each other. One set of wires is constructed and arranged to carry electric current in a first direction through the heating element. The other set of wires is constructed and arranged in a parallel circuit to the first set to carry electric current in the opposite direction through the heating elements. At least one of the sets of wires is further constructed to generate heat when the electric current passes through that set of wires. Each set of wires in the heating element has equal impedance such that any magnetic field generated by one set of wires is reduced or eliminated by an opposing magnetic field generated by the other set.

12 Claims, 3 Drawing Sheets

ELECTRIC HEATING ELEMENTS FREE OF ELECTROMAGNETIC FIELDS

BACKGROUND OF THE INVENTION

This invention relates to electric heating cable suitable for use in electric heating appliances.

French publication (2,611,106) describes a heating element formed from linearly juxtaposed heating wires linked together to form a single wire in a series circuit loop. The two wires are placed side by side and carry equal current in opposite directions such that the resulting magnetic field produced by the wires is reduced.

Watson (U.S. Pat. No. 3,356,835) describes a heating wire which is effectively shielded from damage, abrasion, nicks and cuts.

Weckstein (U.S. Pat. No. 3,859,506) describes a constant wattage heating element in which a conductor rod is enclosed by a tube of electrically insulating material which in turn is enclosed by a tubular conductor. Discrete resistors are provided in the tubular insulator so that the heating element has a constant wattage per unit length.

Wringer et al. (U.S. Pat. No. 3,492,463) describe an electric resistance heater constructed by shrinking a tubular metal jacket about a rod of electrically insulating material, such as boron nitride or berillium oxide, and then shrinking the tube about a rod-shaped or tube shaped resistance conductor, constructed of molybdenum, tantalum, columbium or alloys thereof.

Kishimoto (U.S. Pat. No. 4,698,488), Kishimoto et al. (U.S. Pat. No. 4,792,663) and Farkas (U.S. Pat. No. 4,200,973) describe various flexible thermosensitive wire arrangements suitable for use as self-temperature regulating electric heating cable. In these cables, a pair of electrodes are provided, separated by a semiconductive composition. The temperature of the composition determines its resistance and the current flowing through it. This in turn determines the amount of heat produced at any point in the wire.

SUMMARY OF THE INVENTION

The present invention provides an improved electric heating element suitable for use in close proximity to humans. For example, heating elements of this invention are useful in personal electrical heating blankets for bedding, heating pads for the body, submerged heating elements for water beds, room heating panels for the home, heating elements for automobile seats, and other applications where electric current is brought into proximity with the human body. The element is conventionally powered, for example, in the U.S.A. by 60 Hertz, 120 volt alternating current and produces little or no external electromagnetic field. Such electromagnetic fields are implicated in contributing to increase risk of cancer and other health problems.

The heating element of this invention features at least two juxtaposed or adjacent insulated wires each carrying electric current in opposite directions. The wires are preferably arranged coaxially to generate essentially no electromagnetic field in close proximity to the wires. A suitable arrangement of three wires, however, may also be used for achieving low electromagnetic field in the vicinity of the wires. A parallel circuit is used to generate a desired amount of heat with less electric current through each wire compared to that required for a single wire or series circuit arrangement. This permits use of less expensive, small diameter heating wires.

In a first aspect, the invention features an electric heating element having two sets of adjacent electrically conductive wires electrically insulated from each other. By adjacent is meant that the two sets of wires are placed as close to each other as is possible without electrically connecting the two wires; for example, the wires should be within approximately 4 millimeters, preferably within 2 millimeters, of each other. One set of wires is constructed and arranged to carry electric current in a first direction through the heating element. The other set of wires is constructed and arranged in a parallel circuit to the first set to carry electric current in the opposite direction through the heating element. One of the sets of wires, and preferably both sets, is further constructed to generate heat when the electric current passes through that set of wires. Each set of wires has equal total impedance and thus transmits equal current in the heating element such that any magnetic field generated by one set of wires is reduced or eliminated by an opposing magnetic field generated by the other set.

In the context of the present invention the term "wire" is defined to mean any elongated conductor of electricity regardless of its material composition, e.g., metal, plastic or ceramic, or its geometric form, e.g., solid or hollow extrusion, round, square or ribbon cross section, linear or helical extended form, laminate tape or composite construction.

In preferred embodiments, each set of wires is adapted for connection to an electric power source to generate the currents; and each set of wires includes only a single wire. In a more preferred embodiment, one set of wires includes two wires electrically insulated from each other and the other set contains only a single wire. The set containing the two wires is arranged about (i.e., to each side of) the single wire and each wire in that set carries one half of the amount of current flowing in the single wire.

In other preferred embodiments, the sets of wires are highly flexible and not damaged by bending; they are arranged coaxially to each other; the wires are selected from the group consisting of helical wrapped helical core wire, helical wrapped linear core wire, parallel double helical wire, antiparallel double helical wire and cylindrically enclosed core wire; most preferably the outer coaxial set of wires is a helical conductor having between 4 and 50 turns per inch.

In a related aspect, the above electric heating element is incorporated into electric heating appliances such as those used in proximity to the human body or to human habitation. For example, these appliances may be selected from an electric blanket, a bed warmer, a water bed heater, a body heating pad, an automobile seat heater, a room heating panel and a space heater appliance. Preferably, the heating element is extended in a serpentine or meandering pattern to distribute heat generated from the element.

In another related aspect, the invention features a method for construction of the above electric heating elements. In this method, two sets of electrically conductive wires are provided electrically insulated from each other. As described above, one set of wires is constructed and arranged to carry electric current in a first direction and the other set of wires is constructed and arranged in a parallel circuit to carry electric current in an opposite direction. Further, at least one of the sets of wires is constructed to generate heat when electric current passes through that wire, and the sets of wires provide an equal impedance over the length of the heating element such that any magnetic field generated by one set of wires is reduced or eliminated by an equal and opposite magnetic field generated by the other set. Most preferably, the wires are helically wound and arranged coaxially to each other.

As discussed above, the invention features an improved electric heating element. This heating element has little or no electromagnetic field in the vicinity of the heating element. Electromagnetic fields generated by heating elements are typically measured in gauss units (the CGS system unit of magnetic flux density equal to one maxwell per cm$^2$), and are proportional to the electric current in the element divided by the distance from the element. Long term exposure to oscillating magnetic fields produced around wires carrying alternating current are implicated as possible health risks to humans. In fact, an increased frequency of several forms of cancer is correlated with prolonged exposure to alternating current induced alternating electromagnetic fields (AEM fields). Most studies correlating health risks with the various types of radiation exposure indicate that there is seldom a safe or "no risk" exposure level.

Numerous recently published reports commencing with that of Wertheimer and Leeper (American Journal of Epidemiology, March, 1979) suggest that an increased incidence of some human cancers, including acute myeloid leukemia and certain brain tumors, as well as an increased incidence of birth defects and miscarriages may correlate with regular exposure to AEM fields. Several of the epidemiological survey studies by both American and Swedish investigators suggest that chronic exposure of the body to AEM fields averaging as low as 3 milligauss may be harmful. One of these studies by the epidemiologist David Savitz was part of the New York State Power Line Study published in July of 1987. Samuel Milham, Jr. in The New England Journal of Medicine, July 22, 1982 reported an increased incidence of acute and myeloid leukemia for men working in aluminum electrorefining plants. Michael McDowall in Lancet Jan. 29, 1983 reported a similar finding for electrical workers. Another survey of telephone and power cable linemen in Lancet, Nov. 20, 1982 also shows an increased incidence of acute leukemia. Goodman and Henderson in The Proceedings of the National Academy of Sciences, June 1988 reported that 60 Hertz alternating fields produced altered rates of mRNA and protein synthesis in cultured cells. Paul Brodeur in a three part report entitled "Annals of Radiation" published in The New Yorker magazine, June 12, 19, and 26, 1989, presented a comprehensive review of epidemiological work linking long term exposure to alternating magnetic fields with a variety of human health problems.

Since the strength of an electromagnetic field (which in the USA oscillates at 60 cycles per second) is proportional to the electric current flux, it has been suggested that long term exposure to high current utilizing electrical appliances might be harmful. It has been estimated that 100-200 watt electric blankets, for example, generate an AEM field of between 5 and 25 milligauss in their immediate vicinity. In fact, measurements using standard commercial twin bed size electric blankets (120 watt Fieldcrest Cannon, Inc.) show that in immediate proximity to the heating elements, the electromagnetic field is as high as 400-600 milligauss. At a distance of two inches from the blankets, the field strength decreases, ranging from 4 to 20 milligauss. In the absence of quantitative data on risk versus the intensity and time-integrated exposure to AEM fields, it is prudent to reduce such exposure as much as possible. To this end, it is believed that the AEM field immediately adjacent to conventional electric heating elements should be reduced by at least 10-fold, and preferably 50 to 100-fold. (Such reduction is provided by the heating elements of the present invention.)

Three solutions have been suggested to deal with such alternating current AEM field problems. With electrical wiring inside and outside the home, the path of the wiring may be chosen to minimize human exposure, e.g., by using underground wiring. It has been likewise suggested that people consider reducing proximal contact with certain electric appliances such as electric blankets. Second, power transmission lines or appliances themselves could be converted from alternating current (which is responsible for the oscillating magnetic field), to direct current (DC) which would then produce a steady magnetic field. This steady field would be akin to that of the earth's magnetic field. Third, it has been suggested that magnetic shielding be incorporated into household appliances.

French patent application (No. 2,611,106), which is described above, does not provide an adequate solution to this problem. It provides a series circuit loop with wires placed side by side, carrying equal current in opposite directions. Substantial electromagnetic fields exist in close proximity to these heating wires. The magnitude of these proximal fields is about $\frac{1}{2}-\frac{1}{4}$ of corresponding fields generated by a conventional single wire heating element carrying the same current. Thus, a 100 milligauss AEM field measured at a distance of $\frac{1}{8}$ inch from a conventional electric blanket heating wire element is only reduced to approximately 25 milligauss in this configuration. This measurement location corresponds to the distance between the skin and the blanket surface directly beneath a heating element. Thus, this wire configuration is not adequate for eliminating electromagnetic field in close proximity to heating elements.

Other features and advantages of the invention will be apparent from the following description of the preferred embodiments thereof, and from the claims.

DESCRIPTION OF THE PREFERRED EMBODIMENTS

The drawings will first be briefly described.

Drawings

FIGS. 1A and B are diagrammatic representations of wiring circuits used in prior art heating elements; FIGS. 1C, 1D and 1E are various embodiments of wiring circuits useful in the present invention (for simplicity in FIGS. 1C and 1E and other figures one wire is shown as a straight line; this wire however, may be helically wound);

FIG. 2 is a diagrammatic representation of relative magnetic field strengths in close proximity to various wire configurations; FIG. 2A shows a prior art configuration; FIGS. 2B and 2C show two embodiments of the present invention;

Structure

Figure 1A:
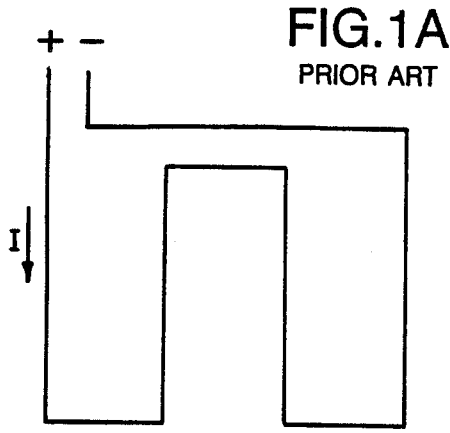

The general structure of an electrical heating element of the present invention is described above. Specific structural considerations are discussed in detail below.

Parallel Circuit

In the present invention, a parallel circuit of electric current is used in at least two wires, or sets and thus a of wires. This allows reduction of the amount of current necessary to generate a desired amount of heat and thus a reduction in the maximum possible residual AEM field. Thus, for example, instead of transmitting 1 amp of current at 120 volts potential through the entire series loop of the blanket, 0.5 amp (120 volts) is sent through two parallel wires which, in combination will generate the same wattage power.

The benefits obtained by employing parallel circuitry in heating elements of the present invention are obtained if the magnitude of currents flowing in opposite directions through the element's separate conductors are essentially equal. Thus, if a certain percentage current imbalance exists in opposing conductors, it is translated into a proportional residual AEM field. Therefore, in constructing parallel circuit heating elements of the present invention, the total resistance of the opposing conductors must be matched. For example, in a coaxial element containing an outer helical-wound conductor, if the helix requires four times the length of wire utilized in the inner linear core wire, then the wire selected for the helix must have $\frac{1}{4}$ the resistivity (resistance per unit length of wire). In a linear triple wire conductor (see FIG. 1D, and below) a single wire is selected to have $\frac{1}{2}$ the resistivity of each wire in the pair of outer wires (FIG. 1D).

Flexibility

It is useful to employ use a helical wire structure in the heating elements for mechanical flexibility. This same mechanical property is achieved in multi-wire coaxial helical structures of the present invention, i.e., sustained flexibility and resistance to mechanical bending fatigue and breakage. In an electric blanket, heating pad, or other appliance which is subjected to many cycles of flexure (e.g., during dry cleaning) it is especially important that the heating element tolerate such mechanical insult. The Underwriter's Laboratory (UL) approval rating for such heating elements in fact requires that it survive approximately 100,000 flexures before breaking. Accordingly, in coaxial heating elements of the present invention, a double helical coaxial two conductor structure is a preferred structure for mechanical as well as electrical reasons.

Helical Wires

Helical coaxial wires containing many helical turns per inch show a more completely attenuated AEM field (measured in close proximity to the wire) than coaxial wires with fewer helical turns. This phenomenon is a consequence of larger local differences along the helix axis in the vectorial sum of I divided by S for two conductors contained within a coarser helical structure (I equals current and S equals distance). The more turns, the more the structure resembles a cylinder, which provides the most desired results in terms of low AEM field.

In addition, in order to achieve substantially better AEM field reduction, the coaxial structure should be of an appropriate scale. For example, in a helical-wound dual conductor structure for an electric blanket heating element, not only the pitch, i.e., spacing of helical turns, but also the diameter of the outermost helical wire of the heating element should be smaller than, or approximately equal to the usage distance for the element. The usage distance is the closest regular contact distance between the heating element and the human body. Therefore, with an electric blanket where the usage distance is approximately $\frac{1}{4}$ inch, the outer coaxial conductor wire should have at least approximately four helical turns per inch as a lower limit and be no larger than approximately $\frac{1}{4}$ inch in diameter.

With regard to an upper limit for the number of helical turns per unit length of the heating element, two factors are relevant. First, a higher density of helical turns increases the material and production cost of the heating element. Second, at very high helical turn densities, e.g., in excess of 100 turns per inch, low level solenoid related electromagnetic fields may be generated outside the helix (a higher density magnetic field is generated and remains inside the helix along its axis; the lower density outside field therefore does not contribute significantly to AEM fields outside the coaxial wire). Since magnetic solenoid field strength is directly proportional to the number of helical turns per unit axial length, it is counterproductive to increase the helix density above that required to achieve an essentially null magnetic field at the usage distance of the heating element as defined above. For most consumer appliance applications of the present invention, e.g., electric blankets and heating pad elements, 20 helical turns per linear inch of heating element suffice. More than 50 turns per inch are seldom of practical use and add expense to the appliance. Therefore generally between 4 and 50 helical turns per inch are most useful.

To the extent that helical wire turns may generate a low level solenoid-type magnetic field outside the helical structure, it is desirable to eliminate this source of AEM field as well. An opposing solenoid field which is generated by the same amount of current traveling in the opposite direction through a side by side paired helical wire can achieve this objective. Thus, a two conductor coaxial heating element comprising two helical wires (having the same rotational sense) carrying current in opposite directions can be used to essentially eliminate solenoid fields as well (which run more or less parallel to the axis of the heating element).

It is preferred that heating elements of this invention be formed from two helical wires wound in the same direction such that no magnetic field is generated by the combined wires when an opposite and identical magnitude current flows through them.

Thermostat

Temperature control in commercial appliances utilizing heating elements of the present invention may be achieved in a variety of ways. Thermostats, high temperature cut off switches and other electrical control components, when used in such appliances should be integrated with little or no increase in AEM field generation. With room heating panels, a separate external control such as a wall mounted thermostat drawing a negligible current (and therefore generating a negligible AEM field) may be employed. However, in electric blankets, heating pads, and a variety of other appliances, thermostats and other control circuit elements must be incorporated into to the appliances themselves to monitor and control temperature.

Figure 3:
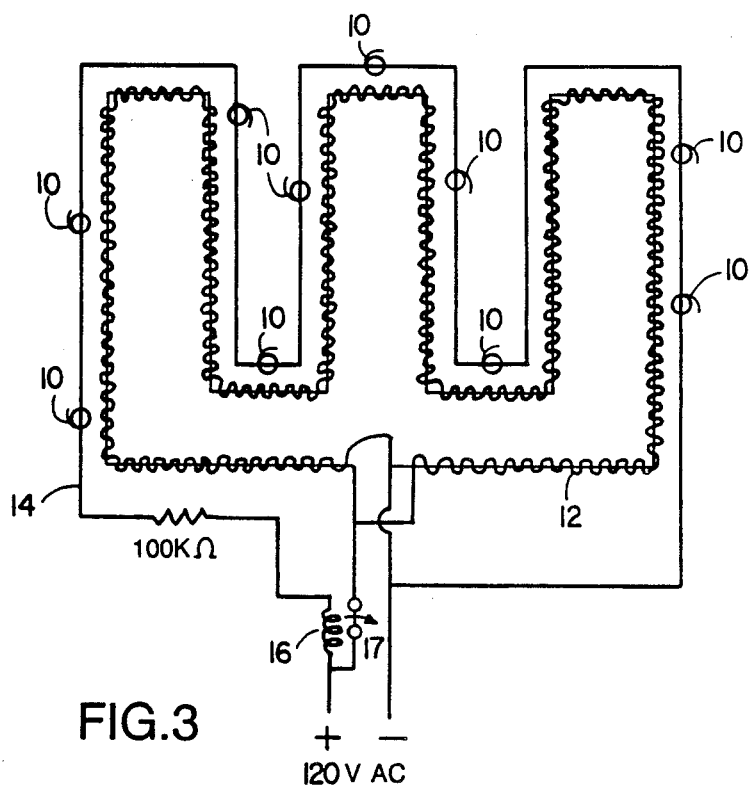
FIG. 3 is a diagrammatic representation of a thermostat overheat protection circuit suitable for use with electrical heating wire of the present invention.

Referring to FIG. 3, it is common to integrate a substantial number, e.g., 10 or more, high temperature cut-off switches 10 throughout an electric blanket so that the blanket cannot overheat in any location. Previously these switches were integrated in series with single resistive wire heating elements which usually follow a serpentine meandering path through the blanket. Any one of these multiple sensor switches, opening at high temperature was sufficient to interrupt current flow through the heating element. Similar series-coupled switches may be utilized with the multiple heating elements of the present invention. In the parallel circuit heating elements described in this invention, however, such switches must be carefully integrated to locally interrupt all of the juxtaposed wires constituting the parallel branches of the circuit and thus prevent overheating.

Since interruptions of the separate wires of some heating elements of the present invention (e.g., coaxial helical elements) may be difficult and/or costly, an alternative arrangement of heat sensors may also be used. Referring again to FIG. 3, a control circuit 14 places the heat sensors in a separate, electrically parallel circuit, rather than in series, with the wires of the heating element 12. The control circuit utilizes negligible current relative to that utilized by the heating element and therefore produces a negligible AEM field. For example, in an electric blanket utilizing 1.0 amp current, the control circuit may utilize only 1-10 milliamp. In FIG. 3, the heating wires each have a total resistance of about 200 Ohms; the control circuit has a total resistance of 100 kOhms. Such a control circuit in a blanket typically contains a multiplicity of high temperature sensing cut-off switches 10 coupled together by a simple series loop of insulated wire 14 which is positioned so as to follow the meandering heating element in the blanket. Any local overheating in the vicinity of a heat sensor will interrupt the control circuit by causing a proximately positioned switch 10 to open. One or two electrical relays 16, or equivalent switches, located in this control circuit are used to conditionally feed line current to the heating element circuit. That is, when the blanket is cool and current is flowing through the control circuit, the control relays are forced closed to supply the heating element with line current. If one or more heat sensors 10 in the blanket opens, current stops flowing through the control relay, cutting off current to the heating element (as shown by arrow 17). This control system is fail-safe because current flow through the control circuit must be maintained to power the heating element and because electrical or mechanical failure of the relays opens the relay, cutting off current to the heating element.

Other temperature control circuits can be designed which are compatible with the low AEM field heating elements described in the present invention. These control circuits are considered to be equivalent and within the scope of the present invention.

Resisivity

To be useful in the present invention at least one (but usually both) of the wires in a given heating element must have sufficient resistivity to produce a useful amount of heat. In a typical electric blanket consuming, for example, about 120 watts power at about 120 volts alternating current (AC), a 1.0 amp heating element extending in a serpentine or meandering pattern for approximately 120 feet throughout a blanket would contain a wire having a resistivity of approximately 1.0 ohm per linear foot. Other larger heating elements (e.g., space heater elements) designed to utilize, for example, 1200 watts power over a much shorter wire distance, such as 12 feet, would require a similar resistivity wire, i.e., 1.0 ohm per foot but of much larger size to allow heat dissipation. The resistivity can be approximately calculated in heating elements of this invention from the electrical equations: $V = IR$ and $P = VI$ where V equals line voltage, I equals current, P equals power, and R equals impedance which, in a simple AC resistive circuit, equals resistance (which is resistivity multiplied by overall length of the resistive element).

There follows examples of electric heating elements of the invention. These examples are provided only to illustrate the invention and are not limiting to this invention.

A number of electrically insulated coaxial two conductor heating elements were constructed, tested, and found useful in the present invention. Coaxial elements were formed with differing two wire geometries including: (i) a 20 turn per inch wire helix around an insulated linear wire core (0.060 inch outer insulated diameter); (ii) a ribbon wire or (iii) a mesh wire, each wrapped around and enclosing an insulated helical wire core (0.060 inch outer insulated diameter); (iv) a parallel double-helical or (v) an antiparallel double helical element. The parallel double helix consisted of a counterclockwise wound helical outer wire (containing approximately 34 turns per inch) wrapped around an insulated inner wire (0.080 inch overall diameter) which itself contained a counterclockwise wound-helical wire core (approximately 50 turns per inch). The antiparallel double helix was similarly formed except that the outer wire helical wrapping was wound in the clockwise direction. Clockwise or counterclockwise sense was determined by viewing the helical wire end on and following the wire's winding direction moving away from the viewer. Additional double helical wires were formed simply by twisting two insulated linear wires around one another (approximately 20 turns per inch) to form coaxial wires whose two conductors had identical helical radii.

EXAMPLE 1

Prior art

Figure 1B:
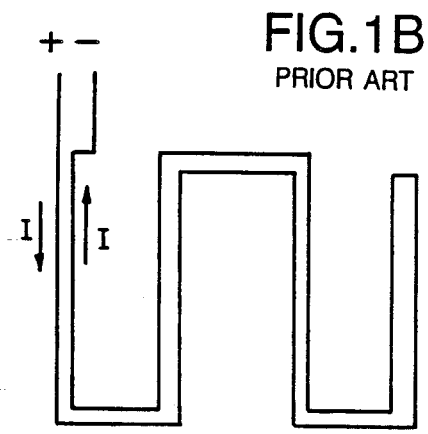

Referring to FIGS. 1A and 1B, the effectiveness of using paired side by side linear electric heating wires to replace single heating wires was tested. Residual AEM fields in close proximity to resistive heating wires were measured as follows: Each wire was powered by a 120 volt, 60 Hertz source through a 120 ohm load resistor to provide a continuous 1.0 amp current. The current was switched between two different geometries of heating wires to allow comparison of their induced AEM fields. Wire geometries were as follows:

(A; FIG. 1A) A single heating wire (Fieldcrest Cannon Inc., 1.0 ohm per foot insulated wire, 0.080 inch outer insulated diameter).

(B; FIG. 1B) Paired wires connected in series, lying flat and immediately adjacent to each other with the 1.0 amp current traveling in opposite directions in the paired conductors (a current loop formed with wire identical to that in (A) above).

In typical use of the electric blanket, the heating wires often rest within 1/8-1/4 inch of the human skin. Thus, measurements were made at approximately these distances from the wires. A Bell Corporation Incremental Gaussmeter Model 640 was used in combination with a tip magnetic field probe (Bell, model SAB4-1808) to provide AC field measurements with a sensitivity limit of approximately 1.0 milligauss. This magnetic probe contains a Hall effect indium arsenide sensing element measuring only 0.060 inch wide, thereby providing a high spacial resolution measurement of local magnetic fields. The field probe was placed at four locations as follows in relation to horizontal heating wires (A) and (B).

(1) probe oriented vertically in the field immediately alongside the horizontal 0.080 inch diameter insulated wire (or wires) at zero elevation relative to the wire (at bottom of wire).

(2) same as (1) above, but with probe raised vertically to 0.125 inches elevation (0.045 inches above wire).

(3) same as (1) above, but with probe raised to 0.20 inches elevation (0.12 inches above top of wire or wires) and with probe moved horizontally to the position of maximum magnetic field.

(4) same as (3) with probe raised to 0.33 inches elevation (1/4 inch above top of wire and wires).

The numbers shown in Table 1 correspond to measured field strength (in gauss) for a 1.0 amp current. It should be noted that as expected from electromagnetic theory, the measured field strengths decrease linearly with the distance from the wire. At distances greater than 1.5 inches from the double wire (B) the residual field was negligible. However, in close proximity to (B) the residual field was reduced only 2-4 fold relative to that of (A). Such "close proximity" contact is encountered in personal use of blankets, heating pads and the like.

TABLE 1

| PROBE LOCATION | (A) SINGLE WIRE | (B) DOUBLE WIRE |
|---|---|---|
| 1 | 0.56 | 0.26 |
| 2 | 0.42 | 0.10 |
| 3 | 0.26 | 0.18 |
| 4 | 0.082 | 0.020 |

EXAMPLE 2

Parallel circuits

Figure 1C:
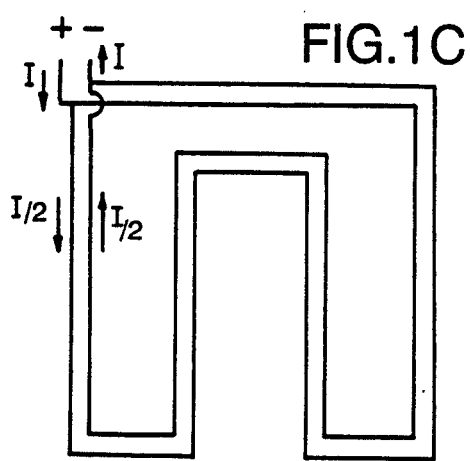
Figure 1D:
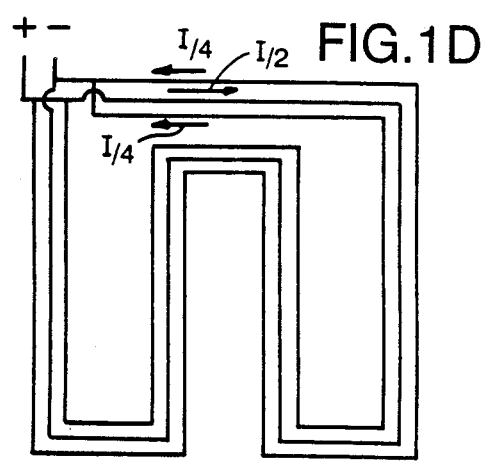

Referring to FIG. 1C, magnetic fields were measured as in Example 1 in a parallel circuit with each of the two opposite polarity wires receiving 0.5 amp 120 volt AC current (each wire was connected to a 240 ohm load resistor to reduce the current to 0.5 amp). The field strengths at probe locations 1, 2, 3 and 4 (see Example 1) were respectively 0.13, 0.05, 0.09 and 0.01 gauss. These measurements represent 50% of those levels reported in Table 1 Column B. This parallel circuit generates a heating capability equal to that of the series circuit in Example 1.

EXAMPLE 3

Wire geometries

Figure 1E:
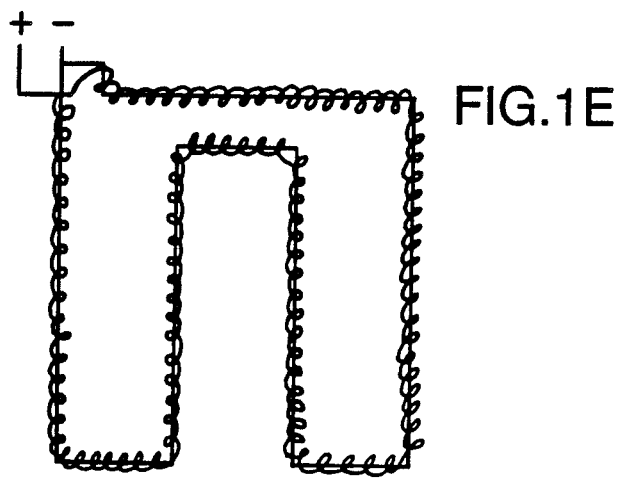

Referring to FIGS. 1D and 1E, AEM fields measured in close proximity to heating elements were reduced by redesigning the antiparallel paired linear wire elements tested in Example 2. FIG. 1 depicts the electrical circuits of several heating elements. For purposes of comparison, a constant total current of 1.0 amp was used to power each circuit as shown.

(A) conventional single wire resistive heating element (see Example 1).

(B) paired wire series circuit heating element (see Example 1).

(C) paired wire parallel circuit heating element (see Example 2).

(D) triple wire parallel circuit heating element.

(E) coaxial wire parallel circuit heating element.

The same parallel electrical circuit shown in FIG. 1C and described in Example 2 was used to supply current to the two heating elements shown in FIG. 1D and E. The element shown in FIG. 1D consisted of three parallel insulated wires (Fieldcrest Cannon, Inc., 1.0 ohm per foot, as described in Example 1) lying flat and immediately adjacent to one another. Current (0.5 amp) was applied in one direction to the center conductor and in the opposite direction to each of the two outer conductors (0.25 amp each). The heating element shown in FIG. 1E is a double-helical coaxial wire consisting of 34 helical windings per inch around an insulated helical central conductor whose outer insulated diameter was approximately 0.080 inches. Identical currents (0.5 amp, 120 volt) were applied to both the inner and outer conductors in opposite directions.

Since AEM field generation (as well as heat generation) is proportional to current, and the total current applied to each of the heating elements in FIG. 1 was constant, the relative effectiveness of the various elements in reducing the residual AEM fields could be directly compared. Gaussmeter measurements were obtained using the probe locations and methods described in Example 1. For maximum sensitivity the instrument was calibrated to 100 milligauss full scale deflection. Measurements from Examples 1 and 2 are included in Table 2 (columns A and B respectively) to allow comparison of the four different wiring geometries shown in FIG. 1A, C, D, and E. Columns C and D respectively provide data for the three wire and coaxial wire configurations described above.

Comparing the ratios in columns B and C for various probe locations, it is evident that the triple wire construction substantially reduces (ie. 4-5 fold reduces) the residual AEM field in close proximity to the wires. The extent of this reduction approximately equaled that obtained by replacing the original single wire heating element with the paired parallel wires. However, the most favorable construction geometry tested, as shown in Table 2 was the coaxial element (column D) which generated no measureable AEM field at each of the locations tested. As long as the inner and outer coaxial wires carried equal and opposite currents, the net AEM field strength remained essentially zero (less than 1-2 milligauss is not detectable by the equipment used in those experiments).

TABLE 2

| PROBE LOCATION | (A) SINGLE WIRE | (B) PAIRED WIRE | (C) TRIPLE WIRE | (D) COAXIAL WIRE |
|---|---|---|---|---|
| (1) | 0.56 | 0.13 | 0.025 | 0.00 |
| (2) | 0.42 | 0.05 | 0.003 | 0.00 |
| (3) | 0.26 | 0.09 | 0.025 | 0.00 |

TABLE 2-continued

| PROBE LOCATION | (A) SINGLE WIRE | (B) PAIRED WIRE | (C) TRIPLE WIRE | (D) COAXIAL WIRE |
|---|---|---|---|---|
| (4) | 0.082 | 0.010 | 0.004 | 0.00 |

EXAMPLE 4

Theoretical AEM fields.

To confirm the validity of the experimental measurements in Example 3, Table 2, calculations were made of the expected net magnetic fields in proximity to the first three of these heating elements (A, B and C). Theoretical data are provided in FIG. 2 (FIG. 2A corresponds to the circuit shown in FIG. 1A; FIG. 2B corresponds to the circuit shown in FIG. 1C; and FIG. 2C corresponds to the circuit shown in FIG. 1D). Calculations were based upon: (i) magnetic field strength being proportional to I/S, and (ii) net magnetic fields resulting from multiple conductors being calculated from the vectorial sum of their individual fields. In FIG. 2, (+) and (−) denote opposite directions of current flow in adjacent wires (insulated wires are drawn in cross section as circles). Net magnetic fields were calculated at spacial coordinates equal to integer multiples of the wire diameter. The magnetic field strength at a distance of one "wire diameter" from the center of the single wire heating element is arbitrarily set to 100 units for purposes of comparison. Thus, at a distance of about two or three wire diameters ($\frac{1}{4}$ inch for a 0.08 inch diameter wire) the expected AEM field for the triple wire configuration is negligible, i.e., 1-2 units.

OTHER EMBODIMENTS

Figure 4:
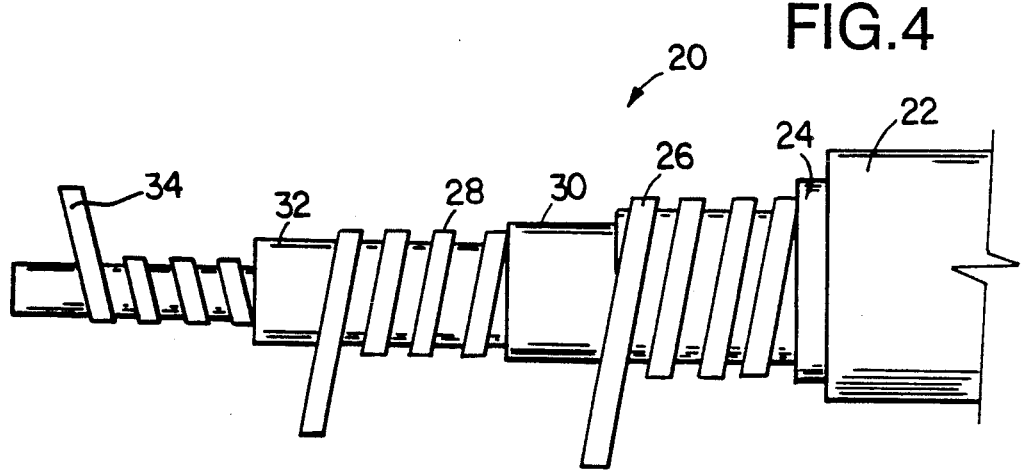
FIG. 4 is an isometric view of a flexible thermostatic coaxial heating element.
Figure 5:
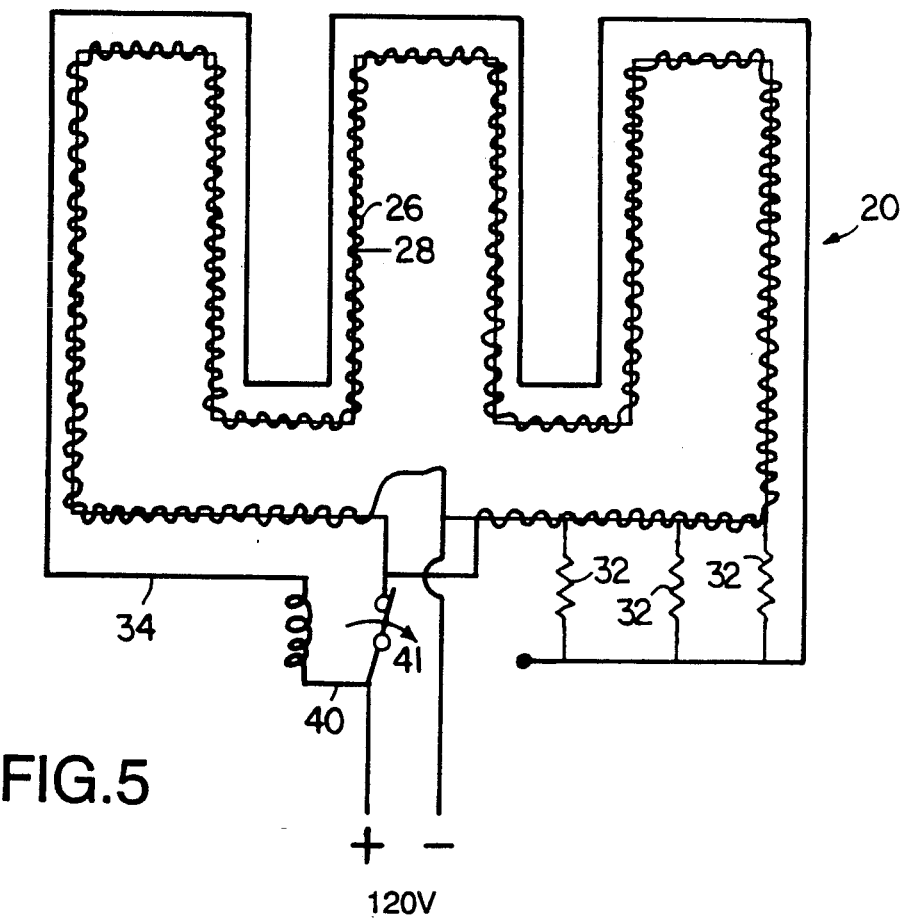
FIG. 5 is a diagrammatic representation of a negative temperature coefficient semiconductor control sensor.

Other embodiments are within the following claims. For example, referring to FIGS. 4 and 5, there is shown a flexible thermostatic coaxial heater element 20 formed with an outer jacket 22, an insulator layer 24 beneath the jacket, and a first helical wire 26. A second helical wire 28 is separated from wire 26 by a second insulator layer 30. Each wire 26, 28 is provided with electric current in opposite directions. Wire 28 is held against a negative temperature coefficient semiconductor 32, for example as described by Kishimoto, supra, and thus in a voltage potential electric contact with a sensing wire 34. FIG. 5 represents the wiring diagram for this element. When semiconductor 32 is cool it has high resistance and passes little current. This allows a closed heater relay 40 to power heating element 20. If overheating occurs in the circuit, the semiconductor resistance falls, the sensor wire current increases, resistor switch 40 moves as shown by arrow 41, and the heating element power is interrupted. The total resistance of semiconductor 32 is about 10-100 kOhms in this circuit; the total resistance of each heating wire is about 200 Ohms.

What is claimed is:

1. An electric heating element comprising a power source having two oppositely charged terminals and two sets of adjacent electrically conductive wires electrically insulated from each other, the ends of a first set of said wires being attached to said two terminals of said power source and constructed and arranged to carry electric current in a first direction through said heating element, a second set being attached in opposite polarity to said two terminals of said power source and being constructed and arranged in a parallel electrical circuit with respect to said first set of wires to carry an equal electrical current in a second opposite direction through said heating element whereby said circuits are electrically connected in parallel to said terminals, at least one said set of wires being further constructed to generate heat when said electric currents pass through said sets of wires, each said set having equal total impedance through said heating element;

wherein any magnetic field generated by one said set is reduced or eliminated by an opposing magnetic field generated by the other said set.

2. The electric heating element of claim 1, wherein each said set of wires is adapted for connection to an electric power source to generate said currents.

3. The electric heating element of claim 1, wherein each set of wires comprises a single wire.

4. The electric heating element of claim 1, wherein one set of said wires comprises two wires electrically insulated from each other, said other set comprises a single wire, said one set is arranged about said other set and each wire in said one set is adapted to carry one half of the amount of current flowing in said other set.

5. The electrical heating element of claim 1, wherein said sets of wires are arranged coaxially to each other.

6. The electrical heating element of claim 5, wherein said set of wires are selected from the group consisting of helical wrapped helical core wire, helical wrapped linear core wire, parallel double helical wire and antiparallel double helical wire and cylindrically enclosed core wire.

7. The heating element of claim 5, wherein at least the outer set of wires comprises a helical conductor having 4 to 50 turns per inch.

8. An electric heating appliance comprising an electrical heating element of any one of claims 1 through 7.

9. The electric heating appliance of claim 8, wherein said appliance is selected from the group consisting of an electric blanket, a bed warmer, a water bed heater, a body heating pad, a room heating panel, an automobile seat heater, and a space heater appliance.

10. The electric heating appliance of claim 8, wherein said electric heating element is arranged in said appliance in a serpentine or meandering pattern, said pattern serving to distribute heat generated from said heating element.

11. A method for manufacture of an electric heating element having negligible magnetic field when an electric current is passed through said element, comprising the steps of:

providing two sets of electrically conductive wires electrically insulated from each other, each set having equal impedance;

constructing and arranging one set of said wires to carry an electric current in a first direction through said heating element to generate heat when said electric current is passed through said set of wires; and constructing and arranging the other said set in a circuit parallel to said one set to carry an equal electric current in the opposite direction through said heating element, said one set being electrically connected in parallel with said other set.

12. The method of claim 11, wherein said sets of wires are arranged coaxially to each other.

* * * * *